US008013942B2

(12) United States Patent
Beals (10) Patent No.: US 8,013,942 B2
(45) Date of Patent: Sep. 6, 2011

(54) REMOTE CONTROL DEVICE PROGRAMMING AND INDICATION OF PROGRAMMING MODE STATUS

(75) Inventor: William M. Beals, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 12/482,247

(22) Filed: Jun. 10, 2009

(65) Prior Publication Data

US 2009/0244403 A1 Oct. 1, 2009

Related U.S. Application Data

(62) Division of application No. 11/118,461, filed on Apr. 29, 2005, now Pat. No. 7,626,641.

(60) Provisional application No. 60/567,029, filed on Apr. 29, 2004.

(51) Int. Cl.
*H04N 5/44* (2011.01)
*G08C 19/00* (2006.01)

(52) U.S. Cl. ................... 348/734; 340/825.72

(58) Field of Classification Search .......... 348/734, 348/552, 569, 706; 340/825.72, 825.69, 340/12.23, 12.28; 341/175, 176; 725/38, 725/59; 398/112
See application file for complete search history.

(56) References Cited

U.S. PATENT DOCUMENTS

| 4,866,434 | A | | 9/1989 | Keenan |
|---|---|---|---|---|
| 5,287,109 | A | * | 2/1994 | Hesse ........................... 341/176 |
| 5,579,221 | A | * | 11/1996 | Mun ............................... 700/83 |
| 5,959,751 | A | | 9/1999 | Darbee et al. |
| 6,774,813 | B2 | * | 8/2004 | van Ee et al. ............ 340/825.69 |
| 6,879,351 | B1 | | 4/2005 | Brown |
| 6,909,378 | B1 | * | 6/2005 | Lambrechts et al. ..... 340/825.22 |
| 6,930,730 | B2 | | 8/2005 | Maxon et al. |
| 7,154,408 | B2 | | 12/2006 | Ku et al. |
| 7,154,566 | B2 | * | 12/2006 | Gustafson et al. ............ 348/734 |
| 7,161,524 | B2 | | 1/2007 | Nguyen |
| 7,218,243 | B2 | | 5/2007 | Hayes et al. |
| 7,626,641 | B1 | * | 12/2009 | Beals ............................. 348/734 |
| 2002/0140569 | A1 | * | 10/2002 | van Ee et al. ............ 340/825.69 |
| 2003/0025840 | A1 | | 2/2003 | Arling |
| 2003/0095211 | A1 | | 5/2003 | Nakajima |
| 2003/0227407 | A1 | | 12/2003 | Yuen |
| 2004/0070491 | A1 | | 4/2004 | Huang et al. |
| 2004/0070516 | A1 | * | 4/2004 | Nielsen .................... 340/825.72 |
| 2004/0119894 | A1 | * | 6/2004 | Higgins et al. ................ 348/734 |
| 2004/0257239 | A1 | * | 12/2004 | Griesau et al. ........... 340/825.69 |
| 2005/0024227 | A1 | | 2/2005 | Dunstan |
| 2005/0110651 | A1 | | 5/2005 | Martis et al. |
| 2005/0151726 | A1 | | 7/2005 | Wouters |
| 2006/0087445 | A1 | * | 4/2006 | Green ....................... 340/825.22 |
| 2007/0130607 | A1 | * | 6/2007 | Thissen et al. ................ 725/132 |

OTHER PUBLICATIONS

Restriction Requirement dated Jan. 9, 2009, U.S. Appl. No. 11/118,461, 6 pages.
Response to Office Action dated Feb. 5, 2009, U.S. Appl. No. 11/118,461, 3 pages. Office Action dated Apr. 3, 2009, U.S. Appl. No. 11/118,461, 10 pages.
Amendment and Response to Office Action dated May 28, 2009, U.S. Appl. No. 11/118,461, 10 pages.
Notice of Allowance and Fee(s) Due dated Jul. 23, 2009, U.S. Appl. No. 11/118,461, 4 pages.

* cited by examiner

*Primary Examiner* — Victor Kostak
(74) *Attorney, Agent, or Firm* — Dorsey & Whitney LLP (57) ABSTRACT

A method and apparatus for assisting a user in programming a universal remote control. More specifically, a method and apparatus for helping the user reestablish system configurations, providing feedback, instructing the user, and supplying system information.

20 Claims, 5 Drawing Sheets

REMOTE CONTROL DEVICE PROGRAMMING AND INDICATION OF PROGRAMMING MODE STATUS

RELATED APPLICATIONS

This application is a divisional application of U.S. patent application Ser. No. 11/118,461, entitled "METHOD AND APPARATUS FOR A SIMPLIFIED POWER SCAN FOR REMOTE CONTROL", filed Apr. 29, 2005, which claims priority to U.S. Provisional Application Ser. No. 60/567,029, entitled "METHOD AND APPARATUS FOR A SIMPLIFIED POWER SCAN FOR REMOTE CONTROL", filed Apr. 29, 2004. Each of these applications is hereby incorporated herein by reference in its entirety.

FIELD OF THE INVENTION

This invention pertains to universal remote controls and, more particularly, the processes of programming universal remote controls.

BACKGROUND OF THE INVENTION

Various devices exist that can be used to receive and record television programs. Most common are VCRs, which can record television programs. More recently, devices known as personal video recorders (PVRs) or digital video recorders (DVRs) have entered the market. PVRs use a hard drive to record digital data that represents a television program. Various optical media and other forms of memory can be used to record television programs or digital representations thereof.

Most recent television receiving devices and recording devices, such as personal video recorders (PVRs), and cable and satellite set-top-boxes, as well as other home electronics, now include universal remote controls. These remote controls allow a user to control the function of the television receiving device and peripheral devices from a distance via a wireless connection. Universal remote controls are typically capable of operating other electronic devices including televisions, VCRs, or DVD players. To operate these other devices, the universal remote control must be programmed by the user.

One method for programming remote controls is known as a power scan. In this scenario, the user continually presses the power button on the remote control for a certain device. At each press of the power button, the remote control selects a different control code from its memory. Once the device turns off, the user signals to the remote control that the current code is operable. For instance, a user will turn on a television he or she desires to have the remote control operate. The user would put the remote into a programming mode. Then, the user would press the power key until the television turns off. Once the television is turned off, the user can press another key on the remote control to direct the remote control to set that television's code.

Programming a remote control can prove frustrating to the ordinary user. In programming the remote control, the television or other electronic devices tend to do some strange things. For instance, during programming the remote control will turn off the television. The user is often left without any idea how to turn the television back on. Many remote controls provide little or no feedback to the user about the programming or the feedback provided would be unintelligible. Sometimes users manage to program the remote control despite these problems. Yet, the remote control still fails to show the user the codes it needs. Thus, the user must go through the programming process again if the remote control needs it in the future.

There is a need in the community to provide remote controls that are easier to program. Should the remote control not get easier to program, there is still a need to provide a simpler method for programming the remote controls. These and other deficiencies of the prior art are overcome by the present invention.

DETAILED DESCRIPTION OF THE INVENTION

In this specification, the present invention will be described using methods and systems related to subscriber satellite television service. This specific description is not meant to limit the invention to that one embodiment. The present invention may also be applicable to cable television systems, broadcast television systems or other television systems. The present invention is also described in terms of digital video recording (DVR) devices. The present invention may also be applicable to digital-versatile-disc (DVD) recording devices or other television recording devices. One skilled in the art will recognize that the present invention can apply elsewhere. While the invention has been particularly shown and described with reference to preferred embodiments thereof, it will be understood by those skilled in the art that various other changes in the form and details may be made therein without departing from the spirit and scope of the invention.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "receiver," "set-top-box," "television receiving device," "television receiver," "television recording device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. "Digital video recorder (DVR)" and "personal video recorder (PVR)" refer interchangeably to devices that can digitally record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and DVR.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity. Thus, in satellite television service a channel may not be the same as in broadcast television service. Rather, channels may be more properly termed service providers in satellite television service. The term "channel" will be used in this description to describe the service providers and the virtual channels they may occupy.

Figure 1:
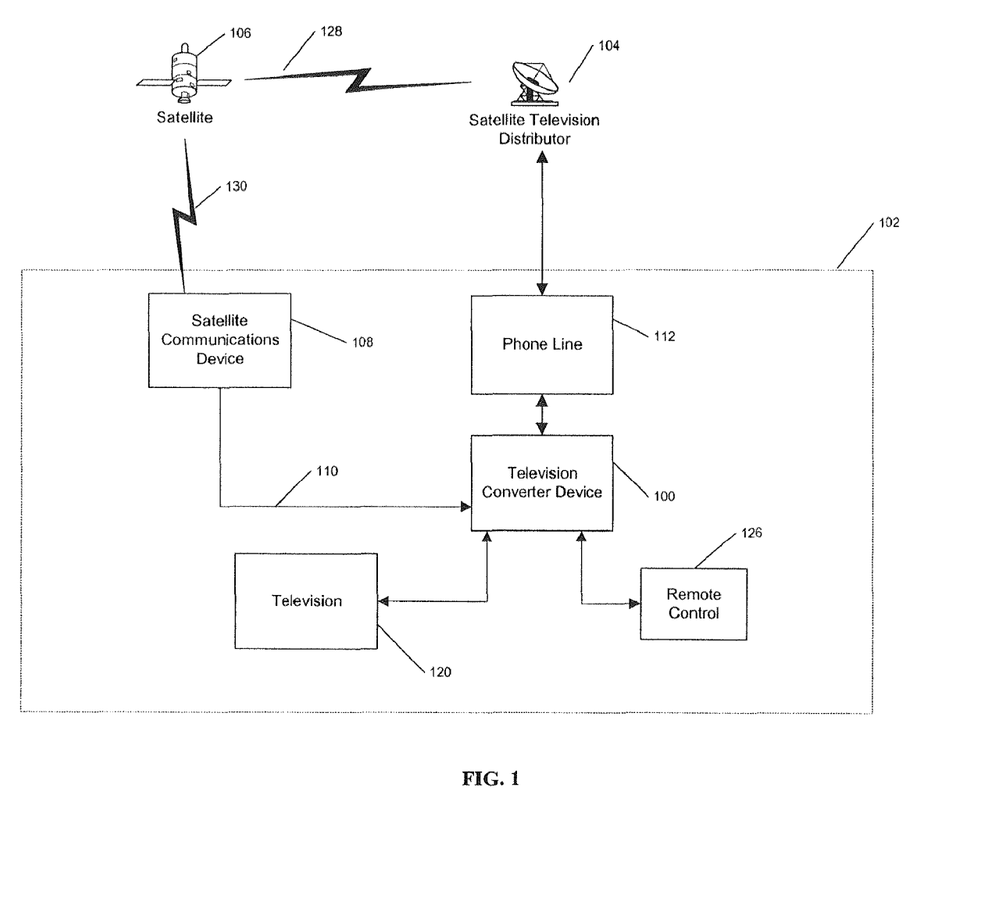
FIG. 1 is a high level block diagram of a system using a television receiving device and a universal remote control of an embodiment of the present invention.

FIG. 1 presents an embodiment of a home entertainment system 102 that includes a television converter device 100 in the form of a satellite set-top-box. Generally, the satellite set-top-box 100 may receive one or more television signals from a cable television distributor, from a broadcast television distributor or from a satellite television distributor 104. As a preferred embodiment, home entertainment system 102 receives signals from satellite television distributor 104. One skilled in the art will recognize that set-top-box 100 may also receive video-digital subscriber line (DSL), DSL, Internet, wireless and other signals from content or video distributors. The satellite set-top-box 100 may process television signals and may send the processed signals to peripheral electronic devices, such as a television 120 and remote control 126. The satellite set-top-box 100 also may accept commands from a remote control 126 or other peripheral electronic devices. More detail about the functionality of the satellite set-top-box 100 is provided below. One skilled in the art will recognize that many embodiments of the entertainment system 102 are possible and within the scope of this invention. Other such embodiments may include, but are not limited to, various combinations or permutations of devices and connections for the delivery, storage, and display of communications, content and other data.

To further describe the home entertainment system, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 MHz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite set-top-box 100 may be possible.

Figure 2:
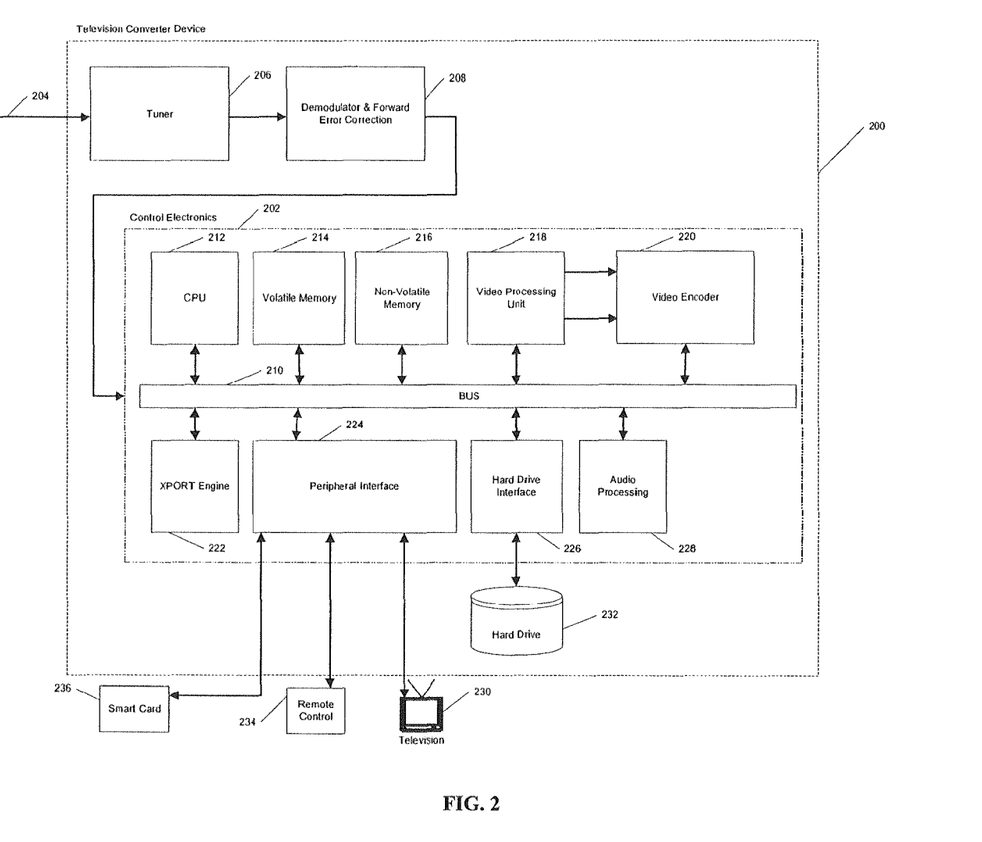
FIG. 2 is a high level block diagram of a television receiving device of an embodiment of the present invention.

FIG. 2 provides a high level block diagram for the satellite television converter device 100, 200 with DVR functionality in accordance with the present invention.

The signal 110, 204 that arrives at the satellite set top box 200 may undergo extensive processing. The television converter 200 may include one or more tuner devices 206 that may receive a satellite signal 204. In this embodiment, tuner device 206 acquires a satellite signal 204 from satellite television distributor 104. Tuner device 206 may initially process the satellite signal 204. Tuner device 206 may also receive subscriber commands in the form of signals from control electronics unit 202. Signals from control electronics unit 202 may include, but are not limited to, signals to tune to a transponder as part of the process of selecting a certain channel for viewing on a peripheral device. One skilled in the art would recognize that the tuner device 206 may include fewer, more, or different components.

After receiving the signal 204, one of the first steps may be to demodulate 208 the signal 204. The signal 204 may arrive as an analog signal that "carries" data (e.g., data is modulated onto the analog signal). Demodulation 208 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 204 may be possible. Another one of the first steps may also be to error check 208 signal 204. One example of error checking 208 is forward error checking (FEC). FEC 208 may include, but is not limited to, inspecting one or more parity bits that may accompany signal 204. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In this embodiment, satellite set-top-box 200 contains control electronics unit 202 that receives satellite signal 204. One skilled in the art will recognize that control electronics 202 may receive other signals, including, but not limited to, signals from a cable or broadcast television distributor. One example of a control electronics unit 202 is the STMicroelectronics STi5517 Low-Cost Interactive Set-top Box Decoder, Part No. 7424736A. In a preferred embodiment, control electronics unit 202 includes discrete electronic components combined into a single circuit with a shared bus 210. In other embodiments, control electronics unit 202 may be configured differently. For example, one or more of the control electronics unit 202 components in set-top-box 200 may be combined or omitted. The control electronics unit 202 may use a custom ASIC, such as from the LSILogic G11 family, or FPGA, such as from the Altera Stratix™ family. As a further example, one or more of the control electronics unit 202 components in set-top-box 200 may not share a bus 210, but may nonetheless be operatively connected by some other means. One skilled in the art will recognize that other configurations of set-top-box 200 and control electronics unit 202 are possible and within the scope of this invention. One skilled in the art will further recognize that some components of set-top-box 200 and control electronics unit 202 may be implemented in hardware or software. The control electronics unit 202 may operate under the control of a software program, firmware program, or some other program stored in memory or control logic. One skilled in the art will also recognize that the control electronics unit 202 may include other electronic components or structures to mediate or process signals.

Control electronics unit 202 may contain one or more central-processing-units (CPUs) 212 or processors. A preferred embodiment of control electronics unit 202 contains a single CPU 212 that is operatively connected to the shared bus. In one embodiment, CPU 212 may be used, among other things, for logical operations for set-top-box 200 functions including, but not limited to, channel selection, recording control, EPG display and control, and system maintenance. Examples of commercially available CPUs 212 include the STMicroelectronics Enhanced ST20 32-bit VL-RISC, Motorola 68000 or Intel Pentium processors. One skilled in the art will recognize that the CPU 212 may be integrated with memory or other discrete electronics components.

Control electronics unit 202 may contain one or more volatile memory components 214. Volatile memory components 214 may include, but are not limited to, one or more SDRAM memory chips. Similarly, control electronics unit 202 may also contain one or more non-volatile memory components 216. Non-volatile memory 216 may include one or more memory chips, including, but not limited to, ROM, SRAM, SDRAM and Flash ROM. One skilled in the art will recognize that volatile memory 214 and non-volatile memory 216 may be integrated within other electronics components. One skilled in the art will also recognize that other memory components may be included within set-top-box 200 and control electronics unit 202. One skilled in the art will recognize that memory 214, 216 may be used for many purposes, including, but not limited to, storing EPG data and storing data for use by CPU 212.

In a preferred embodiment, signal 204 is in digital form (e.g., a digital stream) after demodulation and error correction. For example, digital stream 204 may use, but is not limited to using, the digital video broadcasting (DVB) transport standard. The digital stream 204 may be multiplexed and therefore require demultiplexing by XPORT Engine 222. Demultiplexing 222, or demuxing, may include separating the bits of data into separate digital data streams. The digital streams may be packetized. Thus, the multiplexing of the separate digital data streams may not be bit-by-bit but packet-by-packet. The packet size may vary or may be constant. After demuxing 222 the packets, the separate digital data streams may be reassembled by placing related packets together in a continuous data stream 204.

Each of the separate digital data streams may also be encoded. Encoding is a method for representing data. Encoding may allow the data to be compressed. Compression can provide the system with increased bandwidth. One skilled in the art will recognize that several different encoding formats are possible. In satellite television, encoding formats may include the MPEG, MPEG2 or MPEG4 standards. Beyond the raw data, the separate digital data streams may include forward error correction, headers, checksums, or other information. All of this different information may be included in the digital television signal 204 processed by the satellite set-top-box 100. Control electronics unit 202 may therefore include one or more video processing units 218 that, among other video processing operations, may decode encoded signal 204. In a preferred embodiment, video processing unit 218 may include, but is not limited to, a graphics processor, MPEG-2 decoder and a display compositor with separate on-screen display (OSD) control for peripheral devices. One skilled in the art will recognize that video processing unit 218 may also include other electronics, including, but not limited to, alpha blending, antialiasing, antiflutter and antiflicker filters, memory and video-rendering components.

Another discrete electronic component of control electronics unit 202 may be a video encoder unit 220. Video encoder unit 220 may work in combination with or independently from video processing unit 218. Video encoding unit 220 may encode digital stream 204 for output to one or more peripheral devices, including, but not limited to, a television. For example, video encoding unit 220 may encode digital stream 204 for RGB, CVBS, Y/C and YUV outputs. Encoding may allow program data to be compressed. As a preferred embodiment, video encoder 220 may translate a digital stream into a signal using the NTSC, PAL or SECAM standards. One skilled in the art will recognize that video encoder unit 220 may include other functionality, may be integrated into other electronic components of satellite set-top-box 200, and may encode digital stream 204 using other standards, including, but not limited to, MPEG and MPEG2.

Control electronics unit 202 may also include one or more hard drive interfaces 226 and hard drives 232. In a preferred embodiment, television converter device 200 contains one hard drive interface 226 and hard drive 232. Hard drive 232 may be used for many purposes, including, but not limited to, storing recorded programs, buffering currently-playing programs (e.g., buffering a program may allow a user to pause or rewind a progran1), storing EPG data, storing commands or functions for the control electronics unit 202, storing timers or record events, and storing data for other devices within or connected to the satellite set-top-box 200. As another example, hard drive 232 may be used to temporarily store data for processing by CPU 212. In this example, the hard drive 232 may allow the processor 212 to separate EPG data arriving as part of digital stream 208. One skilled in the art will recognize that other storage devices and interfaces may be substituted for hard drive interface 226 and hard drive 232 and are within the scope of this invention. One skilled in the art will also recognize that hard drive interface 226 and hard drive 232 may separately or together include an integrated memory (e.g., a memory buffer, commonly known or referred to as cache) and additional processing components or logic. One skilled in the art will also recognize that hard drive interface 226 may be integrated into peripheral interface 224 (described below). Finally, one skilled in the art will recognize that hard drive 232 may be external and connected to satellite set-top-box 200. For example, an external hard drive 232 may be connected to satellite set-top-box 200 using USB 2.0 or IEEE 1394 (FireWire) connections. Such an external hard drive may include a screen for portable viewing of programming stored on it.

An audio processing unit 228 may also be part of the control electronics unit 202. Audio processing unit 228 may decode the digital stream 204 for output to peripheral devices, including, but not limited to, a stereo, television speakers or portable audio or video players. For example, audio processing unit 228 may decode MPEG-1 layers I/II and layer III, Dolby Digital, Dolby ProLogic, SRS/TruSurround encoded audio in digital stream 204. Audio processing unit 228 may include one or more processors, memory components or digital-to-audio converter (DAC) systems. One skilled in the art will recognize that other audio processing components and functionality may be accomplished using audio processing unit 228.

A satellite set-top-box 200 may be connected to one or more peripheral electronic devices through peripheral interface 224. These peripheral devices may include a stereo, television 230, smart card 236, VCR, or other devices. In a preferred embodiment, home entertainment system 102 minimally contains, but is not limited to, a television 230 and smart card 236. Television 230 may serve many purposes, including, but not limited to, displaying television programming, displaying the EPG, displaying timer conflicts, and displaying other types of data, graphics and programming. Peripheral devices may receive and/or send signals from the satellite set-top-box 200. For instance, the television 230 may receive video and audio signals and a stereo may receive only audio signals. A camcorder, on the other hand, may send video or audio signals to the satellite set-top-box 100 or receive audio and video signals from the set-top-box 100 to record. As another example, peripheral interface 224 may include a processor or other electronic components to permit an interface to content security devices such as an external "smart card." In this example, peripheral interface 224 may then encrypt or decrypt content for output to other peripheral devices. Thus, peripheral interface 224 may perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices may include many types of commercially available electronic devices.

The home entertainment system 102 may also include a remote control 126, 234 peripheral device, also sometimes referred to as a remote. The remote control 234 may be used to send commands to the satellite set-top-box 200. The remote control 234 may send commands via a wireless connection using, for example, infrared or UHF transmitters within the remote control 234. One example of an embodiment of a remote controller 234 is the EchoStar Technologies Corporation 721 Platinum Plus Remote, Part Number 121150, that includes an IR transmitter and an ultra high frequency (UHF) transmitter. The remote control 234 may be able to send signals to other peripheral electronic devices that form part of the home entertainment system 102, including, but not limited to, a television, stereo, VCR, or DVD player. The set-top-box 200 may also be able to send signals to the remote control 234, including, but not limited to, signals to configure the remote control 234 to operate other peripheral devices in home entertainment system 102. In some embodiments, the remote control 234 has a set of Light Emitting Diodes (LEDs). Some remote controls may include Liquid Crystal Displays (LCDs) or other screens. The remote control may include buttons, dials, or other man-machine interfaces. While the remote control 234 may often be the common means for a subscriber to communicate with the satellite set-top-box 200, one skilled in the art will recognize that other means of communicating with the set-top-box 200 are available, including, but not limited to, attached keyboards, front panel buttons or touch screens.

The satellite set-top-box 200 may also include a remote control interface. A remote control interface may include any means for the user to communicate to the satellite set-top-box 200, and may be implemented using the peripheral interface 224 of control electronics unit 202 or by connecting a peripheral remote control interface device. In a preferred embodiment, a remote control interface may receive commands from one or more remote controls 234. Remote control 234 may use infrared, UHF, or other communications technology. The remote control interface may therefore translate an input from the user into a format understandable by the control electronics unit 202. The translation systems may include, but are not limited to, electronic receivers and electronic relays. One skilled in the art will recognize that other means to receive and translate user inputs are possible.

Another peripheral device and connection to the satellite set-top-box 200 may include a phone line and modem. Set-top-box 200 may use a modem and phone line to communicate with one or more outside entities or systems (e.g., satellite television distributor 104). The phone line may carry local or long-distance telephone service. One skilled in the art will recognize that the phone line may also carry other services, including, but not limited to, DSL service. These communications may include requesting pay-per-view programming, reporting of purchases (for example, pay-per-view purchases), obtaining updates to subscriber programming (e.g., updating EPG data), or receiving updates to software on the satellite set-top-box 100. For example, the phone line may communicate with the satellite set-top-box 100 using an RJ-11 style telephone connection. One skilled in the art will recognize that there are many other uses for this phone line connection. For example, EPG data may be transmitted to set-top-box 200 via phone line or in the satellite signal 204. One skilled in the art will recognize that the EPG data may be transmitted to set-top-box 200 by various other methods, systems and outside entities. Also, one skilled in the art will recognize that a phone line connection to satellite distributor 104 may represent other communication connections, including, but not limited to, wireless, Internet, or microwave communications connections. Another function of the phone line may be to periodically receive the EPG data. One skilled in the art will also recognize that a phone line connection may permit networked communications with other network-ready devices using the telephone wiring within a subscriber's location.

A satellite set-top-box 200 may also include network connectivity. For example, peripheral interface 224 may include components or interfaces that permit the connection of RJ-45 cabling and transmission of TCP/IP traffic to other connected devices. As another example, a wireless router may be attached via peripheral interface 224 to allow wireless local-area-network (WLAN) data communications using a standard wireless networking protocol such as WiMAX, 802.11b or 802.11g. One skilled in the art will recognize that various other network connections to the set-top-box 200 are possible.

The present invention relates to programming remote controls to control a device, such as a component in a home entertainment system, where, for example, the device control codes may not be known to a user. In the embodiments discussed below, it is assumed that the remote controls have previously stored thereon, or otherwise have access to, one or more sets of control codes that control various devices. The sets of control codes may be grouped by type of device. For example, sets of control codes may be grouped by televisions and other display devices, VCRs, and set-top-boxes. Methods to provide control codes to a remote control are well known in the art and are outside of the scope of this specification.

Each remote control in this disclosure is also capable of selectively controlling multiple devices. In one embodiment, the remote control associates a device control code with each device that can be controlled. For example, if the remote control can control three devices, the remote control may reserve and use three memory locations for the three device control codes. Multiple devices may be selected by any method, including, but not limited to, providing a device "mode" key for all devices or providing a device-specific key for each device. One skilled in the art will recognize that other methods of selecting multiple devices are possible.

Figure 3:
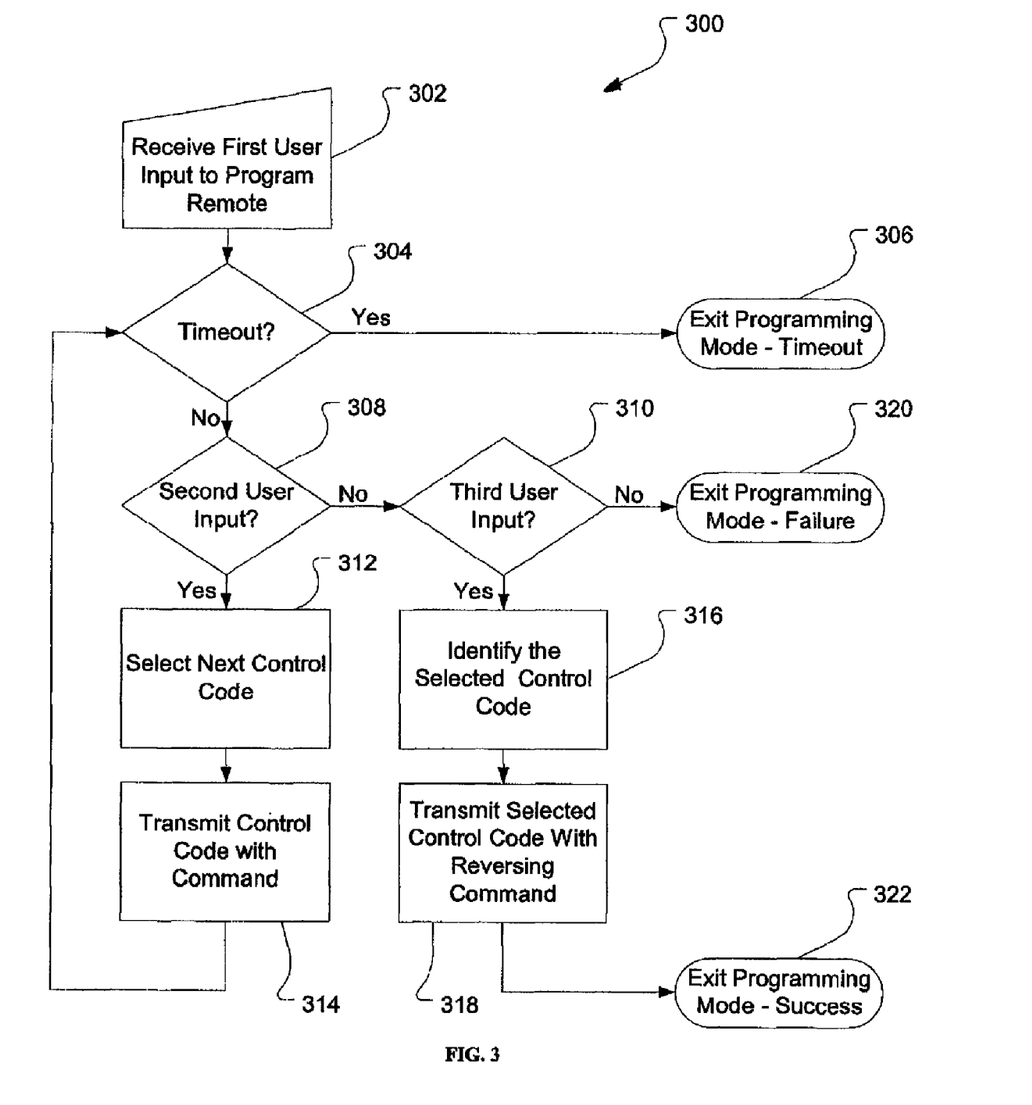
FIG. 3 is a flow diagram illustrating a method for assisting a user in turning a television back on and displaying the device codes during programming of a universal remote control.

In FIG. 3, a method for programming a remote control in accordance with one embodiment of the present invention is described. The method 300 starts with a receiving operation 302 wherein a first user input is received that indicates that the remote control is to be programmed to control some device. Receiving operation 302 initiates a programming mode that allows the user to determine a device control code for a device. The first user input may be a user depressing a specific key on the remote control for a predetermined period of time. One skilled in the art will recognize that alternative first user inputs are possible.

In addition to initiating the programming mode, the first user input may also designate a specific type of device that the user wishes to program the remote control to control. For example, in one embodiment multiple device "mode" keys, such as a TV mode key, a Satellite mode key, a VCR mode key, and an AUX mode key, may be provided on the remote control's keypad. In this embodiment, a first user input of pressing and holding down any of the mode keys for three seconds initiates the programming mode and also identifies the type of device to be programmed (i.e. a display device, a satellite receiver, a VCR, or some other type of device).

In addition to causing the remote control to enter the programming mode and initiating the timeout operation 304 (discussed below), receiving operation 302 may perform several functions. Receiving operation 302 may identify the type of device the user wishes to control. Receiving operation 302 may also designate a command to be sent to the device. Each designation may require one or more user inputs to be performed.

Identification of the type of device may be used to narrow the sets of control codes that must be searched to determine the correct control code for the device to be controlled. For example, a set of TV control codes may be used if the TV mode key is pressed to enter the programming mode. This embodiment will be discussed in greater detail with reference to the selection operation 312 (discussed below).

After entering the programming mode, a timeout operation 304 begins. In this embodiment, timeout operation 304 monitors the remote control for user inputs. If no user input is received within a predetermined amount of time, then the programming mode "times out" and the programming mode exits with timeout exit operation 306. Timeout exit operation 306 returns the remote controller to the mode it was in prior to the receiving operation 302. In one embodiment, timeout exit operation 306 does not change the device control code for the device identified in the receiving operation 302. One skilled in the art will recognize that many ways of performing timeout operation 304 are possible.

If a user input is received within the predetermined time during timeout operation 304, a first determination operation 308 determines if the user input is a specified second user input. For example, a specific key, such as a power, up arrow or right arrow key, or combination of key presses may be specified as the second user input. If the user input is not the second user input, then a second determination 310 (discussed below) determines if the user input is a specific third user input.

If the first determination operation 308 determines that the user input is the second user input, then a selection operation 312 selects a control code from a set of control codes and a transmission operation 314 transmits the selected control code and a command code to the device. The set of control codes used by the selection operation 312 may have been determined as part of the receiving operation 302. Alternatively, the remote control may include only one set of control codes that includes all known control codes for a large set of devices, although this may not be preferred because of the time necessary to select and transmit such a large set of control codes.

During a programming session, the selection operation 312 may select a code from the set of control codes in many ways. In one embodiment, a control code is always selected by the remote control and stored in memory for that device type. Selection operation 312 then finds this control code in the set of control codes and selects the next control code in the set. The selected control code preferably is stored in temporary memory until the programming mode exits, at which time the code in the temporary memory may replace the original code or may be discarded depending on how the programming mode exits. This allows the control codes in the set to be iteratively selected and transmitted in response to multiple second user inputs as shown in the loop described by the timeout operation 304, the first determination operation 308, the selection operation 312 and the transmission operation 314. One skilled in the art will recognize that other ways of performing selection operation 312 are possible and within the scope of this invention. Alternative methods of iteratively selecting codes from a set are also possible and are broadly applicable here.

Embodiments of selection operation 312 may also include additional functions. For example, in one embodiment, selection operation 312 determines if all the control codes in the set or sets of control codes were tested. If all the codes have been transmitted at least once, then an indication is provided to prevent the user from endlessly giving the second user input. The indication may be a flashing of one or more light emitting diodes (LEDs) on the remote control or some other visible or audible indication.

If the first determination operation 308 determines that the user input is not the second user input, then a second determination operation 310 determines if the user input receiving in the timeout operation 304 is a specified third user input. Whereas the second user input can be considered a command by the user to test the next control code in the set, the third user input can be considered a command from the user that the last control code sent worked in controlling the device.

If the second determination operation 310 determines that the user input is the third user input, then an identify operation 316 identifies the currently selected control code (selected by the last selection operation 312 and transmitted by transmission operation 314) as the command code to the device. The identity operation 316 may include setting a flag to the control code in the set or storing the selected control code to memory in a specific location as the device control code for that type of device.

As a result of receiving the third user input, a second transmission operation 318 transmits the currently selected control code to the device along with a command that reverses the effects of the command sent by the first transmission operation 314. For example, if the command sent in the first transmission operation 314 was a power off, the command sent by the second operation 318 is a power on command. After the identification operation 316 and second transmission operation 318 are completed, the programming mode exits successfully in success exit operation 322.

If the user input received in timeout operation 304 is neither the second nor the third user input, then it is some other unspecified user input. In this case, failure exit operation 320 exits the programming mode in failure. Such an unspecified user input may be considered a user cancellation of the programming mode. In one embodiment, failure exit operation 320 does not change the device control code stored in memory for the device. In an alternative embodiment, failure exit operation 320 stores a predetermined default control code in memory.

Each of the various exit operations 306, 320, 322 in the method 300 may also provide an exit operation indicating the status of the programming upon exit. The exit operation indication may be visible or audible. For example, the exit operation indication may include flashing one or more LEDs on the remote controller in some predefined sequence. Each of the exit operations 306, 320, 322 may provide its own specific exit operation indication, i.e., the timeout exit operation 306 providing a timeout indication (for example, a high frequency flashing of the LEDs), the failure exit operation 320 providing a failure indication (for example, a continuous illumination of the LEDs), and the success exit operation 322 providing a programming successful indication (for example, a low frequency flashing of the LEDs). The exit operation indication may persist until receipt of a user input to verify that the user saw the indication.

Figure 4:
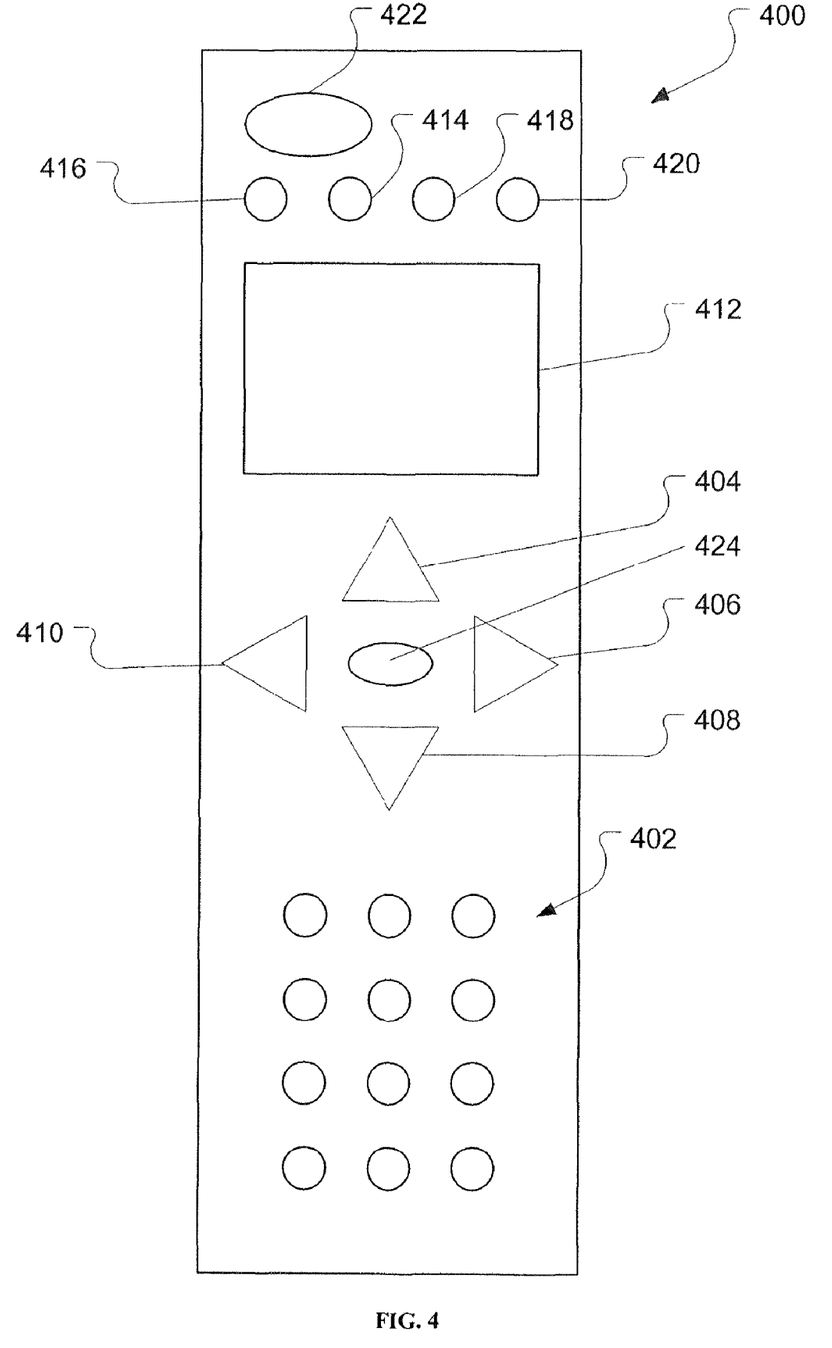
FIG. 4 is a flow diagram illustrating a method for providing programming feedback to a user by the flashing of LEDs on the remote control.

In addition to the exit operation indications (described above), the exit operation indication may display the device control code that was successfully selected in the programming process by the user. The code may be displayed to the user via an LCD 412 on remote control 400 (discussed below). Alternatively, for remote controls specifically designed to operate in concert with a companion device in the home entertainment system, the success exit operation 322 may include transmitting a command to the companion device indicating exit of the programming mode by a success exit operation 322, providing the control code selected and causing the companion device to have the control code displayed on a television in the home entertainment system. The user may be instructed to make a record of this control code for future reference, such as in the event that the programming of the remote control is lost. The displayed code may include the control code and a command code specific to the device. The command code may correspond to a command to power on, power off, play, rewind, fast forward, volume up, volume down, record, pause, or picture-in-picture the device.

FIG. 4 is one embodiment of a remote control 400 suitable for performing the method 300 described in FIG. 3. The remote control includes a plurality of keys including a standard telephone-style keypad 402 having keys for 0-9, # and *. In addition, the remote control 400 shown has four arrow keys: an up arrow key 404, a right arrow key 406, a down arrow key 408, and a left arrow key 410. A select key 424 is provided between the four arrow keys 404, 406, 408, 410. One skilled in the art will recognize that other ways of arranging keys are possible. One skilled in the art will also recognize that the addition or subtraction of the number and type of keys is possible.

In the embodiment shown, an LCD screen 412 is also provided on the remote control 400. The LCD screen 412 may display text and graphics to the user. In addition, the LCD screen 412 may also be a touch sensitive screen allowing the user to make user inputs via the LCD and issue commands to the remote control.

In this embodiment, the remote control 400 is capable of selectively controlling up to four different devices. Selecting the devices is achieved through four device "mode" keys, each illuminated with a LED inside the key, that are provided on the keypad. The keypad includes a TV mode key 414, a satellite receiver mode key 416, a VCR mode key 418, and an AUX mode key 420.

A detailed example of a specific embodiment of the method 300 in FIG. 3 is described below. This example uses the embodiment of a remote control, as shown in FIG. 4, which includes multiple stored sets of control codes for various device types (e.g., one or more control code sets are identified with each satellite receiver, TV, VCR, or auxiliary device types).

In this example, the second user input described in method 300 also includes two user inputs: pressing the up arrow key 404 and the down arrow key 408. Depending on which key is pressed, the control code selected by the selection operation 312 will be different. Each set of control codes in this example is stored as a table or list of control codes wherein each control code is stored as an entry in the table. The table defines a sequence of control codes such that receipt of the up arrow key 404 as the second user input selects the next control code in the table and receipt of the down arrow key selects the immediately previous control code.

In the example, the receiving step 302 receives a first user input of the user pressing and holding a mode key for three seconds before releasing the key. If the AUX mode key is the first user input, the set of control codes must be further identified with an additional keystroke by the user. In the example, a "0" keystroke identifies the TV mode set of control codes. A "1" keystroke identifies the VCR mode set or sets of control codes. A "2" keystroke identifies a tuner or amplifier set of control codes. A "3" keystroke identifies all sets stored in the remote control to be used. After the 0, 1, 2, or 3 selection is made, an additional "*" keystroke must be entered.

Next, the user must designate the command to be transmitted along with the control code when test transmissions are made by the first transmission operation 314. In the example, the user must press the power key 422.

After receiving the power key user input, the remote control waits for an input from the user. Pressing either the up arrow 404 or the down arrow 408 will increment or decrement to the next table entry and transmit the power code associated with the currently selected table entry and wait for another user input.

The remote control provides an indication to the user that all codes in the selected sets of codes have been tried by rapidly flashing all the LEDs of the mode keys eight times. In addition, an indication is provided to the user for each subsequent receipt of an up arrow key or down arrow key user input after all codes in the selected set of codes have been tried.

If the signal transmitted by the remote control is operative, then the device will turn off (if the device is on) or turn on (if the device is off). If upon pressing the up or the down arrow keys 404 or 408, nothing happens, then the user keeps pressing the same button until the remote control indicates that all codes in the selected set of codes were tried.

If the device does respond to a transmission, the user presses the "#" key on the main keypad 402. In response to the "#" user input, the remote control stores the currently selected control code into memory and transmits a second power command to the device using the currently selected control code to return the device to its original power state. Note that for some devices such as TVs the command code for turn on and turn off are the same code. In this case, the power on command and its reverse command are the same.

In the example, a timeout period of 20 seconds is provided. If no keystrokes or other user inputs are detected within that period, timeout exit operation 306 will occur and the programming mode will timeout. The remote control may then return to normal operation without changing any stored control codes.

Note also that different manufacturers may provide different control codes and command codes for their devices. In this case, the table of command codes may also include the different command codes appropriate for the device with that control code. In these embodiments, determining the command code for a device may also be performed as part of the selecting operation 312.

Figure 5:
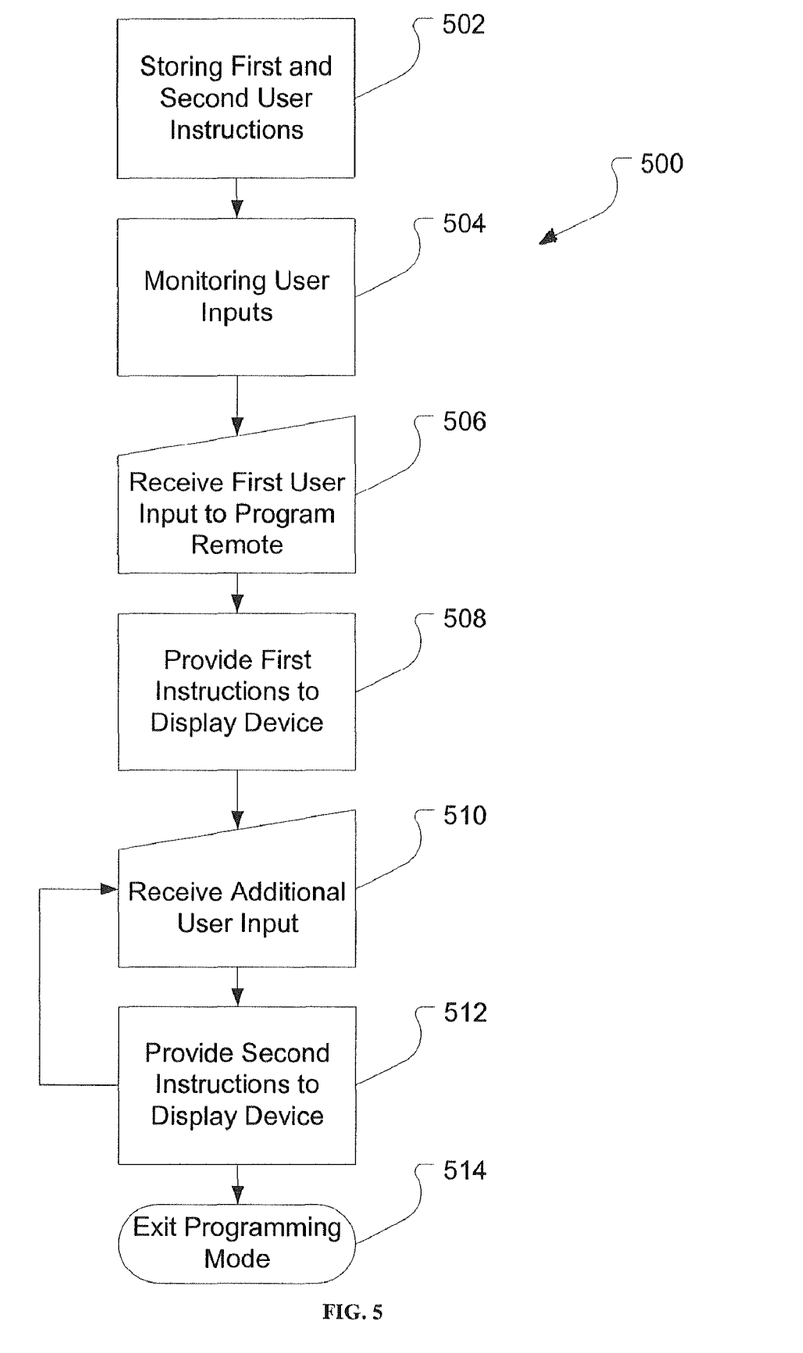
FIG. 5 is a flow diagram illustrating a method for providing the user an interactive instructional program to follow during programming.

FIG. 5 illustrates a method 500 in accordance with another embodiment of the present invention. The method 500 is directed at displaying instructions to the user while the remote control is in a programming mode.

In the method 500, a storing operation 502 is performed that stores instructions on how to program the remote control that may ultimately be shown to the user. The instructions may be stored on the remote control or may be stored on a device with which the remote control is provided. In general, the first and second instructions give feedback to the user based on user inputs provided. Each instruction displayed may ask the user a question or prompt the user for user inputs. In one embodiment, the instructions may be periodically updated to cover additional features or provide more information.

A monitoring operation 504 monitors the user inputs received by the remote control. This operation may be performed by the remote control itself, or may be performed by a device such as a set-top-box or television that monitors transmissions sent by the remote control. In these cases, the devices must have the capability to interpret the transmissions of the remote control and determine the user inputs that caused the transmissions. Alternatively, the remote control may be designed to work in concert with a companion device like a set-top-box. In this case, the remote control also sends a transmission to the companion device that alerts the companion device to the user inputs for every transmission sent to other devices.

Upon receipt of a user input, the remote control next enters a programming mode in receiving operation 506. Embodiments of the receiving operation 506 include those described above for the receiving operation 302 with reference to FIG. 3.

Upon entry of the programming mode, a providing first instructions operation 508 causes first instructions to be displayed on a display device. The display device may be a television connected to the home entertainment system or may be the LCD 412 of the remote control. The first instructions may be selected based on the type of device identified in the receiving operation 506 as well as other factors. For example, if the AUX mode key is the first user input, then the first instructions may be, "Enter '0' to search TV codes; '1' to search VCR codes; or '2' to search external amplifier or tuner codes. After entering your selection, press '*'."

After display of the first instructions, an additional user input is received in a second receiving operation 510. In response to receiving the additional user input, second instructions are displayed on the display device by a providing second instructions operation 512. The providing second instructions operation 512 may include an analysis operation (not shown) that analyzes the user input received by the second receiving operation and, based on the results of the analysis, selects specific second instructions from a set of possible second instructions. For example, if a user input is received that would cause the programming mode to exit in failure, the second instructions may ask the user "Are you sure?"

After displaying instructions based on the received user inputs, the process may be repeated for any additional user inputs that may be received. Each additional user input received may cause second instructions to be displayed to the user.

This cycle of receiving user inputs and displaying second instructions may continue until an exit programming mode operation 514 occurs. Embodiments of various exit programming mode operations were described above with reference to FIG. 3. In addition, as part of the exit programming mode operation 514 additional second instructions may be provided to the display device. Such second instructions may include asking the user if the user is sure he wants to exit or alerting the user that a timeout will occur absent user action within a certain amount of time.

It will be clear that the present invention is well-adapted to attain the ends and advantages mentioned as well as those inherent therein. While presently preferred embodiments have been described for purposes of this disclosure, various changes and modifications may be made which are well within the scope of the present invention. For example, while in programming mode the selection and first transmission operations may be done automatically without receiving second user inputs from the user. Numerous other changes may be made which will readily suggest themselves to those skilled in the art and which are encompassed in the spirit of the invention disclosed and as defined in the appended claims.

What is claimed is:

1. A method for programming a remote control to control a device identified by a device control code, comprising:
  receiving at the remote control a first user input to enter a programming mode in which the device control code for the device is to be determined;
  in response to the first user input, entering the programming mode;
  exiting the programming mode; and
  upon exiting the programming mode, providing a visual indication of a status of the programming mode when exiting, wherein the visual indication comprises a first indication if the device control code for the device was successfully determined, and a second indication if the device control code for the device was not successfully determined.

2. The method of claim 1, wherein the visual indication includes flashing one or more LEDs in a specific pattern associated with the status of the programming mode.

3. The method of claim 1, wherein providing the visual indication comprises:
  providing a timeout indication if exiting occurs because no user inputs were received within a predetermined period of time;
  providing a success indication if exiting occurs because of receipt of a second user input that selects the device control code from a set of device control codes; and
  providing a failure indication if exiting occurs because of receipt of any user input that is different from the second user input that selects the device control code from the set of device control codes.

4. The method of claim 3, wherein one or more LEDs are illuminated at a high frequency for the timeout indication, are illuminated at a lower frequency for the success indication, and are continuously illuminated for the failure indication.

5. The method of claim 1, wherein providing the visual indication comprises:
  providing the visual indication until receipt of a second user input.

6. A method for programming a remote control to control a first device associated with a device control code, the first device being part of a home entertainment system including a display device, the method comprising:
  receiving a first user input to enter a programming mode in which the device control code for the device is to be determined;
  in response to the first user input, entering the programming mode;
  exiting the programming mode; and
  upon exiting the programming mode, displaying the device control code on the display device if the device control code was successfully determined.

7. The method of claim 6 wherein the home entertainment system further comprises a television converter device, the display device being a television coupled to the television converter device and further comprising:
  monitoring, by the television converter device, the signals sent by the remote control for signals indicative of an attempt by the user to program the remote control to control the first device; and
  upon exiting the programming mode, transmitting by the remote control a success indicator to the television converter device.

8. The method of claim 6 wherein the remote control comprises the display device.

9. The method of claim 6 further comprising:
  requesting the user to store the displayed device control code for future reference.

10. The method of claim 6, wherein displaying the device control code comprises:
  displaying a composite code that includes the device control code and a command code.

11. The method of claim 10, wherein the command code is a specific function of the first device.

12. The method of claim 11, wherein the function is selected from the group consisting of power on, power off, play, rewind, fast-forward, volume up, volume down, record, pause, or picture-in-picture functions.

13. A remote control, comprising:
  a transmitter configured to transmit commands wirelessly;
  a user interface configured to receive user input; and
  data storage configured to store device control codes, wherein each of the device control codes identifies at least one device that the remote control is programmable to control;
  wherein the remote control is configured to:
    receive a first user input to enter a programming mode to determine the device control code of the device control codes stored in the data storage that allows the remote control to control a first device;
    in response to receiving the first user input, enter the programming mode;
    exit the programming mode; and
    upon exiting the programming mode, provide an indication to the user of a status of the programming mode after exiting, wherein the indication comprises:
      a timeout indication if the remote control exits the programming mode when no user inputs were received within a predetermined period of time; and
      a failure indication if the remote control exits the programming mode when the user interface receives a second user input indicating that the device control code allowing the remote control to control the first device has not been determined.

14. The remote control of claim 13, wherein the indication of the status of the programming mode further comprises:
  a success indication if the remote control exits the programming mode when the user interface receives a third user input that selects the device control code that allows the remote control to control the first device.

15. The remote control of claim 13, further comprising:
  at least one visual indicator configured to provide the indication of the status of the programming mode.

16. The remote control of claim 13, wherein:
  the user interface comprises mode keys, wherein each of the mode keys is associated with a particular type of device; and
  the first user input is a press of one of the mode keys for at least some predetermined period of time, wherein the one of the mode keys is associated with the first device.

17. The remote control of claim 16, wherein:
the remote control is configured to select, based on the one of the mode keys, a subset of the device control codes stored in the data storage from which the user may select the device control code allowing the remote control to control the first device.

18. The remote control of claim 13, wherein the remote control is configured to:
upon successfully exiting the programming mode, provide an indication of the device control code selected by the user as allowing the remote control to control the first device.

19. The remote control of claim 18, further comprising:
a visual display configured to present the device control code selected by the user upon successfully exiting the programming mode.

20. The remote control of claim 18, wherein:
the remote control is further configured to transmit the device control code selected by the user by way of the transmitter to a television converter device coupled with a television for presentation to the user by way of the television.

* * * * *